United States Patent [19]

Shiojiri

[11] Patent Number: 4,570,205

[45] Date of Patent: Feb. 11, 1986

[54] STROBE APPARATUS

[75] Inventor: Shosaku Shiojiri, Osaka, Japan

[73] Assignee: West Electric Company, Ltd., Osaka, Japan

[21] Appl. No.: 622,237

[22] Filed: Jun. 19, 1984

[30] Foreign Application Priority Data

Jun. 21, 1983 [JP] Japan .................. 58-112153

[51] Int. Cl.⁴ ............................. G03B 15/02
[52] U.S. Cl. .................. 362/18; 362/342; 362/346
[58] Field of Search ............... 362/16, 17, 18, 346, 362/342

[56] References Cited

U.S. PATENT DOCUMENTS

| | | | |
|---|---|---|---|
| 4,141,057 | 2/1979 | Dietrich et al. | 362/18 |
| 4,141,059 | 2/1979 | Shiojiri | 362/18 |
| 4,175,279 | 11/1979 | Asaki | 362/18 |
| 4,190,880 | 2/1980 | Esaki | 362/18 |
| 4,276,579 | 6/1981 | Yako | 362/18 |
| 4,286,867 | 9/1981 | Kashiwagi | 362/18 |
| 4,293,892 | 10/1981 | Plummer | 362/18 |
| 4,323,952 | 4/1982 | Proske | 362/18 |
| 4,333,127 | 6/1982 | Alkema et al. | 362/17 |
| 4,380,787 | 4/1983 | Stone | 362/16 |

FOREIGN PATENT DOCUMENTS

| | | | |
|---|---|---|---|
| 2740516 | 3/1979 | Fed. Rep. of Germany | 362/18 |
| 2757846 | 6/1979 | Fed. Rep. of Germany | 362/18 |
| 127536 | 10/1980 | Japan | 362/18 |

Primary Examiner—Ira S. Lazarus
Attorney, Agent, or Firm—Cushman, Darby & Cushman

[57] ABSTRACT

A lower part of a reflection mirror is cut away to admit light flooding downwards in a special photographing situation, for instance, close-up photography, by slidably removing an auxiliary movable mirror part from the cut away part. By sliding the movable mirror part to cover the cut away part of the reflection mirror, a normal light angle is obtainable. Thereby, both close-up flash photographing without any parallax of flash light, as well as, normal flash photographing with a correctly flooded flash light are obtainable.

9 Claims, 10 Drawing Figures

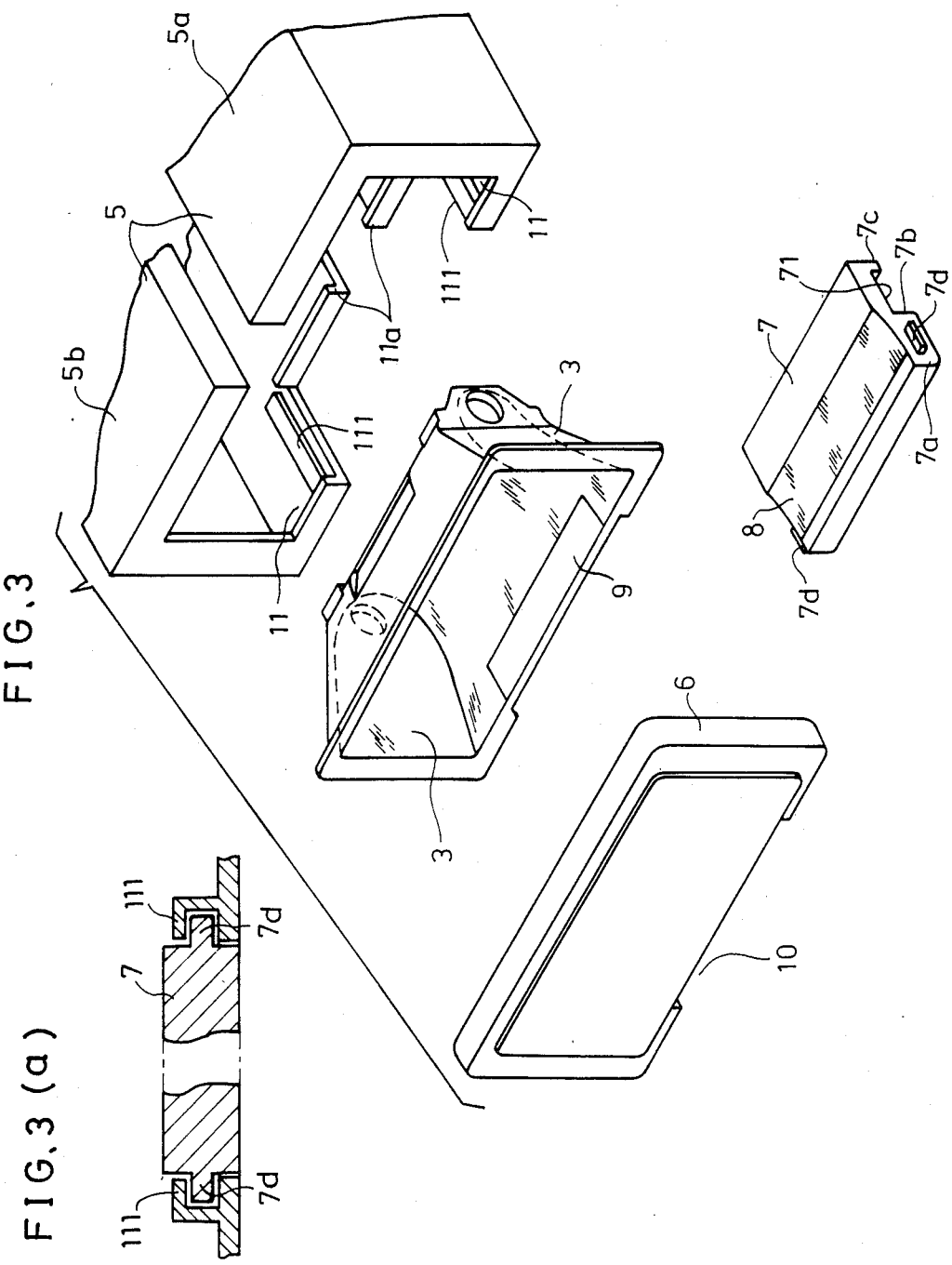

STROBE APPARATUS

BACKGROUND OF THE INVENTION

1. Field of the Invention

The present invention relates generally to a strobe apparatus for strobe photographing, and one which is particularly suitable for adaptation in close-up photographing where parallax of light angle is a problem, and one which is also suitable for photographing using both bounced light and partially direct light.

2. Description of the Prior Art

Hitherto, it has been known that in a general strobe apparatus mounted on an ordinary still camera for photographing, the range of flashed light from the strobe apparatus and range of photographing angle are of the relation as shown in FIG. 1. The range of dotted lines shows the angle range of the flashed light by the strobe apparatus 1 and the angle range shown by solid lines is of the photographing angle of the camera 2. As shown in FIG. 1, since the optical axis of the photographic lens 21 and the optical axis of the flash apparatus 1 are apart by a distance H, parallax between the flashing angle and the photographing angle exists, and it becomes a more severe problem when the distance from the camera to the object is smaller and when the distance H between the lens center and the center of the flash light is the larger.

When the two angle ranges, that is, flash light angle and photographing angle differ from each other, there is produced an insufficiently illuminated part of the photographic object when photographed, and this problem is generally called parallax of light. To describe more in detail, provided that when the distance between the camera and the photographic object is as small as $D_1$, a part O-O' of the objective scenery is not illuminated by the flash light from the strobe apparatus 1, and when the distance is larger as shown by $D_2$, then the smaller part P-P' of the objective scenery only is out of illumination by the flash light.

In order to overcome the above-mentioned problem, recently several devices have been proposed. A first proposed device is shown in FIG. 2(a), wherein the optical axis of a strobe apparatus, determined by relative spatial relation between the strobe lamp 4 and a reflex mirror 3, is fixedly tilted. That is, the optical axis of this strobe apparatus is permanently downwardly tilted to an axis $l_3$ which is tilted by an angle x° from the normal optical axis $l_1$ of an ordinary strobe apparatus, by mounting the reflex mirror in a tilted position with respect to a casing 5.

Another proposal is that, in a bounce light strobe apparatus as shown in FIG. 2(b), on top of a known mechanism for bounce flashing, that is a head rotation mechanism, a further mechanism is added to select the optical axis at a slightly downward tilted position $l_3$ from the ordinary position $l_1$. By such means, an x° downward tilting is possible.

The device shown in FIG. 2(a) can be realized at a relatively cheap cost; but this apparatus has a poor efficiency since a part of the flash light is lost by the lower end of the opening part of the casing 5 and the lower end of the optical panel 6, and moreover, since there is a gap between the front end of the reflection mirror 3 and the optical panel 6 the appearance of the front lower part of the flash apparatus is not satisfactorily neat. Furthermore, since the optical axis of the flash apparatus is tilted downward there may be an undesirable parallax between the flash light angle and the photographic angle for long distance photographing.

On the other hand, in the hitherto-proposed apparatus of FIG. 2(b), since the small downward tilting angle is given by downward tilting of the movable head part, a small downward tilting from the normal operation angle requires a complicated configuration, hence an increase of manufacturing cost, and also a problem of the mechanical strength at the pivotting part cannot be disregarded. Furthermore, the configuration of FIG. 2(b) requires a structure of pivotted movable tilted angle which is common with the expensive bounce type flashing apparatus. Accordingly, for a small type flash apparatus where no bounce flashing is necessary the configuration is not suitable in view of higher cost of manufacture. Besides, for a small type flash apparatus, the small angle adjustment necessary for parallax compensation can not be achieved by such pivotted structure.

SUMMARY OF THE INVENTION

The purpose of the present invention is to provide an improved strobe apparatus wherein compensation of parallax between the flash light and the objective scenery is achieved easily for a close-up photographing, and no undesirable parallax between the flash light angle and the photographing angle for photographing a far away objective is produced.

A strobe apparatus in accordance with the present invention comprises:

a strobe light emission source, a reflection mirror having at least a light passing region, a movable member having a partial mirror part and is held in a relatively movable relation with respect to the reflection mirror, in a manner to cover the light passing region by the partial mirror part, for completion the reflection mirror in one position of motion and to uncover the light passing region in the other position of motion, a casing for containing the strobe light emission source and the reflection mirror and the movable member in a movable relation with respect to the reflection mirror.

BRIEF DESCRIPTION OF THE DRAWING

FIG. 3 is an exploded perspective view showing an essential part of an embodiment of a strobe apparatus in accordance with the present invention.

FIG. 3(a) is a cross-sectional view which shows engagement of the side protrusion 7d in the guide rails 111.

Figure 1:
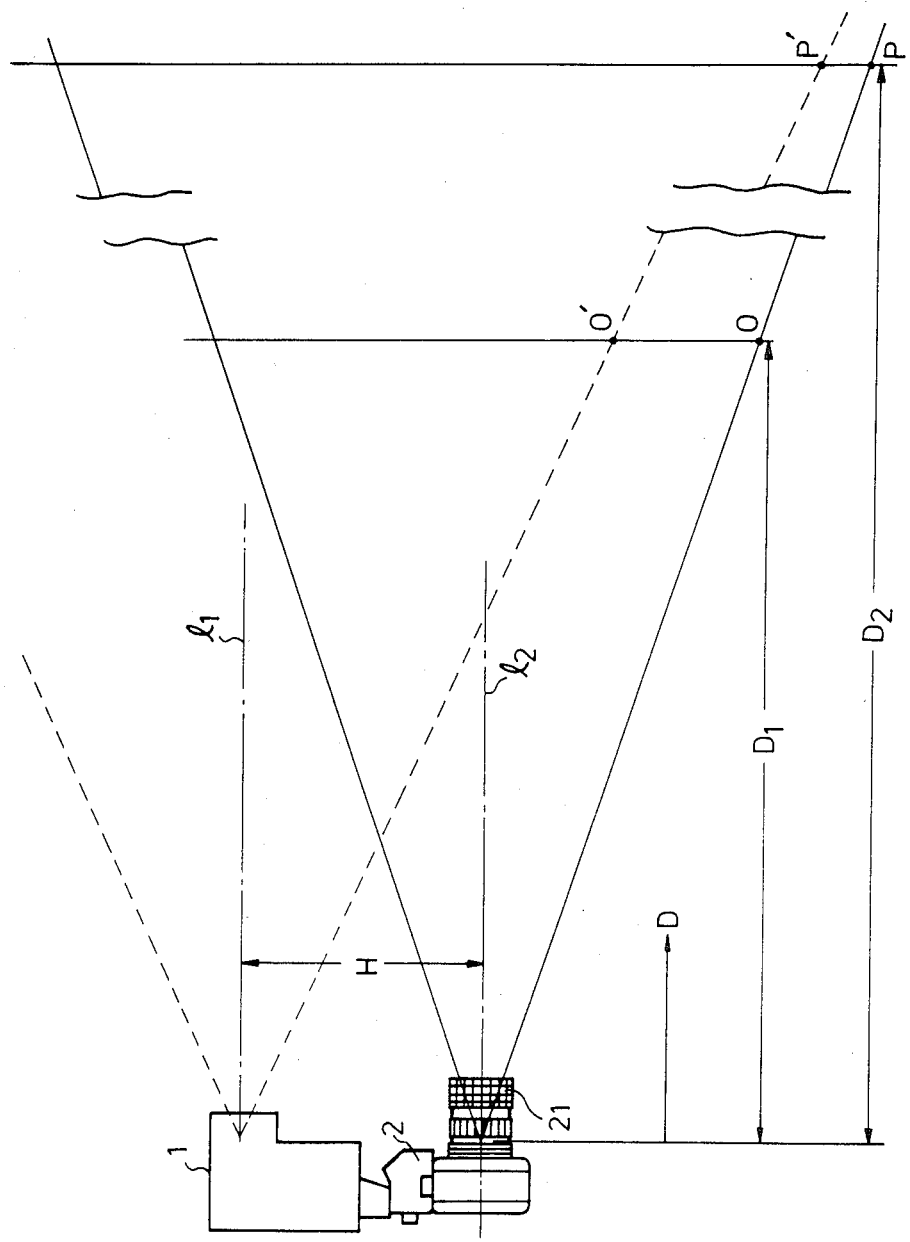
FIG. 1 is the schematic side view of the strobe apparatus mounted on and applied to the ordinary still camera, for illustration of parallax between the flash light angle and the photographing angle.
Figure 2A:
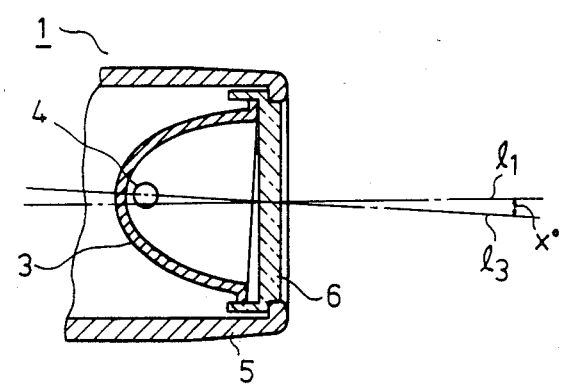
FIG. 2(a) is the sectional view of an essential part of one conventional proposed strobe flash.
Figure 2B:
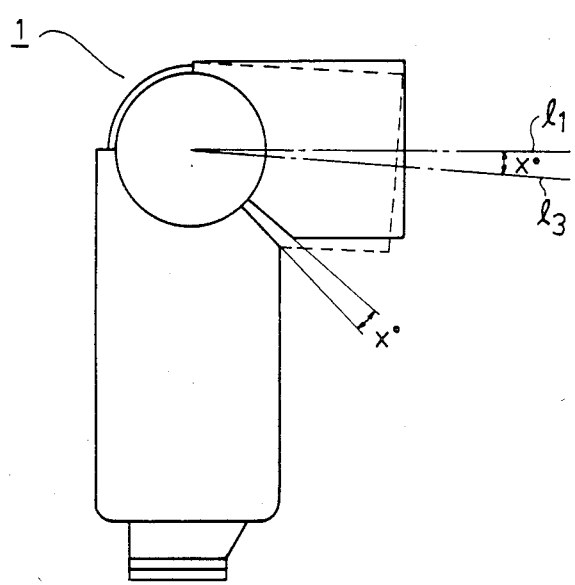
FIG. 2(b) is a side view of another conventional proposed strobe flash.
Figure 4B:
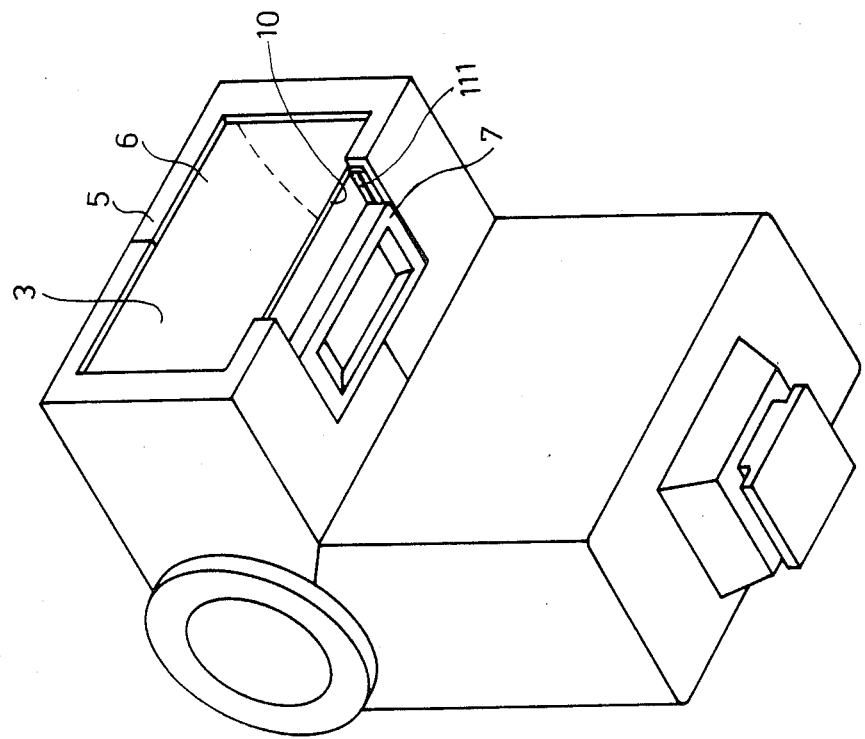
FIG. 4(a) and FIG. 4(b) are perspective views showing the strobe apparatus shown in FIG. 3, respectively for a normal photographing state and for a close-up photographing state.
Figure 4A:
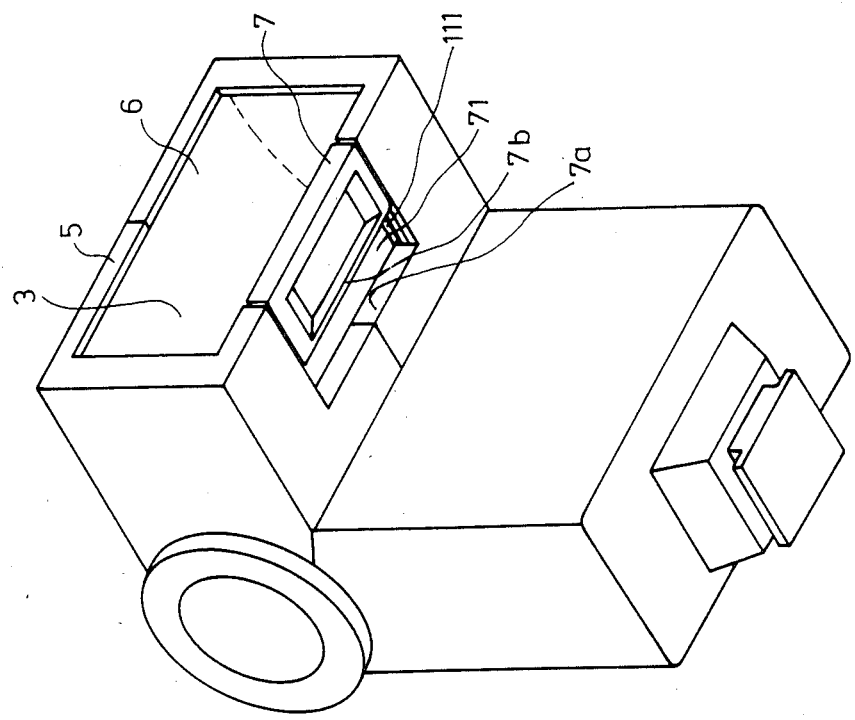

correspond to the states of normal flashing and close-up flashing shown in FIG. 4(a) and FIG. 4(b), respectively.

Figure 6:
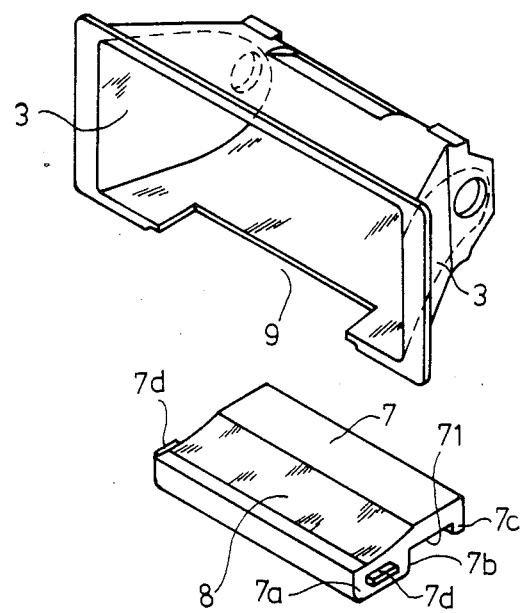

FIG. 6 is a exploded perspective view showing essential components of a modified embodiment of a strobe apparatus in accordance with the present invention.

DESCRIPTION OF THE PREFERRED EMBODIMENTS

Figure 5A:
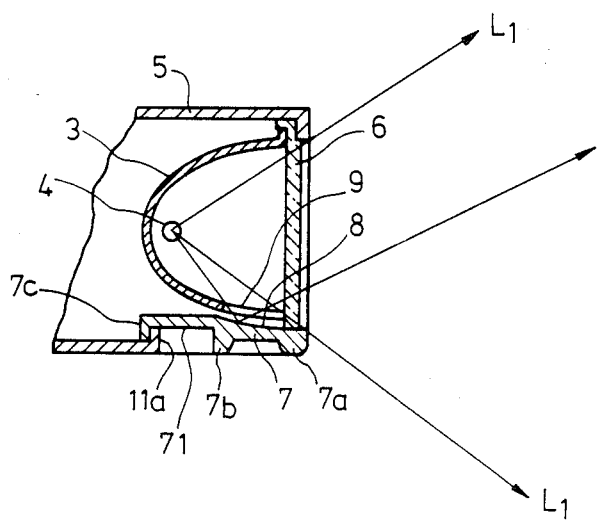
FIG. 5(a) and FIG. 5(b) are sectional side views of the essential parts of the strobe apparatus of FIG. 3, FIG. 4(a) and FIG. 4(b), where FIG. 5(a) and FIG. 5(b)
Figure 5B:
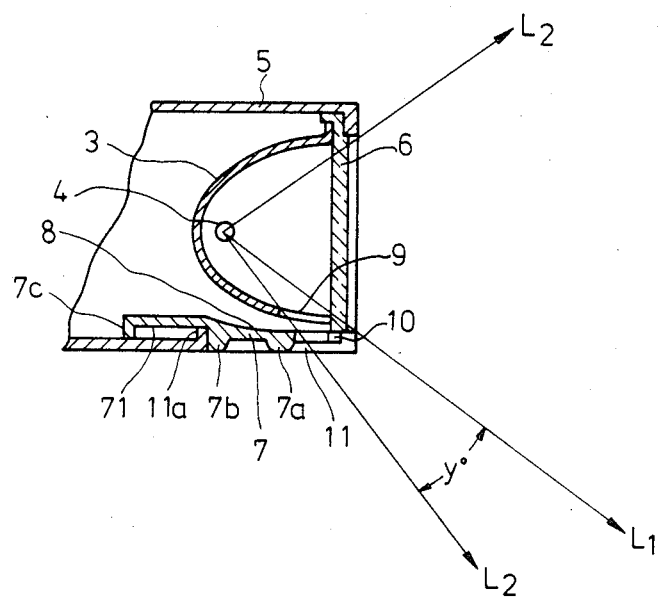

A preferred embodiment is shown in FIG. 3 which is an exploded view of the essential parts of the strobe apparatus of the embodiment. FIG. 4(a) and FIG. 4(b) are perspective views of the same embodiment, and FIG. 5(a) and FIG. 5(b) are sectional views of the essential part of the embodiment. FIG. 4(a) and FIG. 5(a) show a state of normal operation. FIG. 4(b) and FIG. 5(b) show the strobe apparatus of the first preferred embodiment arranged for close-up photographing, wherein light angle is broadened downward.

As shown in the figures, half molded shells 5a and 5b together form an essential part of the case 5 when combined together, a reflection mirror 3 to be fixed in the case 5 has a light passing region 9, which is for instance, made as a transparent part whereon no mirror layer such as an aluminum vacuum-deposited layer is formed. In another modified embodiment, the light passing region 9 may be a cut-away part of the reflection mirror 3 as shown in FIG. 6. A slidable member 7 is slidably held on an inside wall of the bottom of the casing 5 so as to cover the light passing region 9 by its small reflection mirror part 8 formed thereon when the slidable member 7 is pulled forward as shown in FIG. 4(a) and FIG. 5(a). The bottom face 11 of the casing 5 has guide rails 111 with which side protrusions 7d of the movable member 7 is slidably engaged, and has stop bar 11a for defining sliding stroke of the movable member 7 by engagement with a recess 71 between a front protrusion 7b and a rear protrusion 7c. An optical member 6 which is, for instance, a light diffusing panel or a Fresnel lens has a cut-away part 10 for admitting a lower part of flash light going out therethrough.

Parallax compensation function in accordance with the embodiment is as follows. Normal strobe photographing is carried out by putting the moving member 7 in the forward position shown in FIG. 4(a) and FIG. 5(a), wherein the small mirror part 8 of the moving member 7 is situated under the light passing region 9 of the reflex mirror 3. Accordingly, the lower part of the flash light is reflected by the small reflection mirror part 8 of the moving member 7, and therefore the reflection mirror 3 operates in the same way as the ordinary ones without the light passing part 9, and the light angle is as shown by lines $L_1$ in FIG. 5(a). This state of the strobe apparatus is suitable for flash photographing of a distant object where parallax between the flash light angle and the photographic angle is negligibly small.

On the other hand, for close-up flash photographing, the moving member 7 is pushed backward as shown in FIG. 4(b) and FIG. 5(b). Accordingly, the light passing region 9 of the reflection mirror 3 is not covered by the small reflection mirror part 8 of the moving member 7, and therefore, the light directly from the light emitting source 4 such as a xenon lamp and light reflected by various parts of the reflection mirror 3 can pass through the light passing region 9 downward. Accordingly, the angle of the flash light $L_3$ becomes extended to the lower part as shown by the lines $L_2$ which is wider than y° than the angle shown by the lines $L_1$, $L_1$ in FIG. 5(a).

That is, by pushing the moving member 7 backward, the angle of light of the strobe apparatus is extended by the extent of y° downward, and thereby the parallax problem when close-up flash photographing is carried out is eliminated.

Incidentally, the configuration of the abovementioned embodiment can be applied also for a bounce flashing, for instance, by selecting the optical axis of the reflection mirror 3 upward and leading a direct flash light passing through the light passing region 9 to the photographic object. Thus an improved photographing effect is achievable especially for portrait photographing.

Since there is no need of providing a mechanically fragile tile angle adjusting means for adjusting the head part of the strobe apparatus, the apparatus in accordance with the present invention is mechanically reliable, has no part to spoil light efficiency, and the undesirable parallax problem in case of close-up flash photographing is effectively eliminated by providing a very simple configuration of a movable member having a small reflection mirror part.

What is claimed is:

1. A strobe apparatus comprising:
    a strobe light emission source,
    a reflection mirror having at least one light passing region provided therein,
    a movable member having a mirror part, said movable member being disposed in a relatively movable relation with respect to said reflection mirror in a manner to cover said light passing region with said partial mirror part for completion said reflection mirror in one position thereof and to uncover said light passing region in another position thereof,
    a casing containing said strobe light emission source, said reflection mirror and said movable member.

2. A strobe apparatus in accordance with claim 1, wherein:
    said light passing region being constituted by a cutout formed in a non-central part of said reflection mirror.

3. A strobe apparatus in accordance with claim 1, wherein
    said light passing region is a transparent window formed on a non-central part of said reflection mirror.

4. A strobe apparatus in accordance with claim 1, wherein
    said movable member is slidably held in a space between an outer wall of said reflection mirror and an inside wall of said casing.

5. A strobe apparatus in accordance with claim 1, wherein
    said light passing region is formed at a lower part of said reflection mirror and said movable member is held movable under said reflection mirror.

6. A strobe apparatus in accordance with claim 1, wherein
    said casing has a light passing part at a part correspondingly outside said light passing region.

7. A strobe apparatus in accordance with claim 1, which further comprises:
    a light diffusion panel made of a translucent substance and having a light passing region at a part corresponding to said light passing region.

8. A strobe apparatus, comprising:
    a casing having a forwardly disposed aperture;

a concavely-curved reflection mirror received in said casing and constructed and arranged to direct light out of said casing through said aperture and thus towards a scene which is to be photographed;

a strobe light emission source constructed and arranged to illuminate said reflection mirror;

said concavely-curved reflection mirror being constituted by at least a main member and an auxiliary member, said auxiliary member being mounted in said casing for linear sliding movement relative to said main member, between a first, forward position wherein said auxiliary member cooperates with said at least one main member to define a substantially continuous concavely curved reflecting surface constructed and arranged for directing light from said strobe light emission source out through said aperture towards the scene which is to be photographed, and a second, retracted position in which said auxiliary member is so far linearly slidingly retracted relative to said main member as to expose means defining a lower auxiliary aperture adjoining the first-defined aperture and thereby permit some of the light from said strobe light emission source to be directed from said casing through said lower auxiliary aperture.

9. The strobe apparatus of claim 8, wherein:
said reflection mirror is at least generally parabolically curved and said auxiliary member thereof, when in said first position thereof is arranged to provide a lower lip portion of the perimeter of said aperture.

* * * * *